United States Patent [19]

Kurita et al.

[11] Patent Number: 4,985,286

[45] Date of Patent: Jan. 15, 1991

[54] ABRASION-CONCEALING AGENT FOR GLASS CONTAINERS, ABRASION-CONCEALED GLASS CONTAINER, AND METHOD FOR CONCEALING ABRASIONS ON GLASS CONTAINER

[75] Inventors: Akitsugu Kurita; Yoshiaki Takezawa; Nobuhiro Saitoh; Takehisa Shimada; Hideaki Takemoto, all of Tokyo, Japan

[73] Assignees: Toshiba Silicone Co. Ltd.; Asahi Breweries, Ltd., both of Tokyo, Japan

[21] Appl. No.: 515,306

[22] Filed: Apr. 27, 1990

[30] Foreign Application Priority Data

Apr. 27, 1989 [JP] Japan ................................. 1-108873
Feb. 28, 1990 [JP] Japan ................................. 2-48389

[51] Int. Cl.$^5$ .................... C09D 183/04; A47G 19/22
[52] U.S. Cl. .................... 428/34.7; 428/429; 427/387; 427/389.7; 106/287.14; 106/287.13; 106/287.16; 215/DIG. 6; 215/12.2
[58] Field of Search .................... 106/287.14, 287.13, 106/287.16; 252/312; 427/387, 389.7; 428/429, 34.7; 215/DIG. 6, 12.2

[56] References Cited

U.S. PATENT DOCUMENTS

| | | |
|---|---|---|
| 4,467,068 | 8/1984 | Maruyama et al. |
| 4,500,669 | 2/1985 | Ashlock et al. .................... 524/440 |
| 4,518,727 | 5/1985 | Traver .................... 524/35 |
| 4,547,397 | 10/1985 | Burzywski et al. .................... 427/164 |
| 4,702,773 | 10/1987 | Ashlock et al. .................... 106/287.12 |
| 4,757,106 | 7/1988 | Mayer et al. .................... 524/262 |
| 4,780,245 | 10/1988 | Burke et al. .................... 252/312 |
| 4,788,001 | 11/1988 | Narula .................... 252/312 |
| 4,847,120 | 7/1989 | Gent .................... 427/387 |
| 4,874,547 | 10/1989 | Narula .................... 252/312 |

FOREIGN PATENT DOCUMENTS 2088249 9/1982 United Kingdom .

OTHER PUBLICATIONS

Chemical Abstracts, vol. 100, No. 14, Apr. 2, 1984. Columbus, Ohio, U.S.A.; p. 291; ref. no. 108148B & JP-A-58167449 (Toshiba Silicone) (10-03-83).
Chemical Abstracts, vol. 109, No. 16, Oct. 17, 1988. Columbus, Ohio, U.S.A.; p. 291; ref. no. 1337705 & JP-A-63117932 (Toshiba Silicone) (5-21-88).

*Primary Examiner*—William R. Dixon, Jr.
*Assistant Examiner*—Alan Wright

[57] ABSTRACT

An abrasion-concealing agent for glass containers, which comprises (A) a polyorganosiloxane and (B) a volatile polydimethylsiloxane, a glass container in which abrasions on the surface thereof have been concealed by the abrasion-concealing agent, and a method for concealing abrasions on a glass container by using the abrasion-concealing agent. The abrasion-concealing agent has excellent abrasion-concealing properites, film strength, water resistance, safety, workability and resistance to an aqueous alkaline solution washing, and does not cause any damage to labels on glass containers in the coating process.

15 Claims, No Drawings

4,985,286

ABRASION-CONCEALING AGENT FOR GLASS CONTAINERS, ABRASION-CONCEALED GLASS CONTAINER, AND METHOD FOR CONCEALING ABRASIONS ON GLASS CONTAINER

FIELD OF THE INVENTION

The present invention relates to an abrasion-concealing agent for glass containers, an abrasion-concealed glass container, and a method for concealing abrasions on a glass container.

BACKGROUND OF THE INVENTION

Glass containers for use as packages for beverage products, such as beer, refreshing drinks, milk, yogurt, and coffee, have conventionally been collected from the market after use, washed, and then reused. As such reusable glass containers are used repeatedly, their appearances are impaired more and more because the containers suffer abrasions on the surface thereof during the filling processes and subsequent shipping due to contacts with each other or with metallic parts of machines and apparatuses. The impaired appearance quality of the packages results in decreased commercial values of the beverages in the containers. The above has been the state of things in the reusable glass containers.

Under these circumstances, an abrasion-preventing agent which serves to prevent glass containers from suffering abrasions, a concealing agent which is coated over abrasions on glass container surfaces to conceal the abrasions, and an abrasion-preventive concealing agent which has both abrasion-preventing effect and abrasion-concealing effect (hereinafter referred to as an abrasion-concealing agent) have been devised and several agents of such types have so far been proposed. Such an abrasion-concealing agent should simultaneously satisfy some requirements such as the following:

(1) A film obtained from an abrasion-concealing agent should have good abrasion-concealing properties;
(2) The film should have a high film strength under abrasion-occurring conditions;
(3) The film should have good water resistance;
(4) The film should be free of surface tack;
(5) An abrasion-concealing agent should be easily coated and able to form, at ordinary temperature, a film having the required properties;
(6) An abrasion-concealing agent should be non-toxic;
(7) The film should be easily and completely peeled off by washing with an aqueous alkaline solution; and
(8) An abrasion-concealing agent should not cause damage to a label attached to the glass container.

The above requirements are explained in detail below.

The film must, of course, have good abrasion-concealing properties first. In addition, the film is required to have a high film strength sufficient to withstand conditions under which abrasions occur due to contacts with machines and plastic cases during the beverage-filling process and packing operations after film formation and during subsequent shipping. The water resistance of the film must be such that immersion of a glass container in water does not result in blushing or peeling of the film, because glass containers filled with beer or refreshing drinks often undergo water condensation after cooled in refrigerators or showcases and then taken out therefrom and are also often immersed in cold water. The tack-free properties of the film surface are required to give good hand feeling in handling and to avoid fouling of the glass container by adhesion of dust, etc. Easiness of coating and the ability to form at ordinary temperature a film having the necessary properties are required because the flammability is diminished, the safety of the working atmosphere is ensured if the solvent vapor is non-toxic, the coating equipment, etc., are not expensive, and coating after filling can be conducted without changing the quality of the contents. Further, the abrasion-concealing agent and the film obtained therefrom should be non-toxic and odorless because the glass container is to contain a beverage.

Furthermore, the reasons why the film is required to be peeled off with an aqueous alkaline solution are as follows. Even if the film is a permanent coating which is tenaciously adhering to the glass container, and is not peelable with alkali, it is difficult to prevent the permanent coating itself from suffering abrasions and it is impossible to prevent the coating film from suffering damages due to washing process, which is repeated for repeated use of the glass container. Therefore, it is, after all, rational that the film be easily peeled off when the glass container is washed for repeated use and a new film be formed by coating treatment. Such a method is excellent from the standpoint of appearance quality as well.

Still more important for the abrasion-concealing agent than the above requirements is not to damage a label attached to the glass container. Coating of the abrasion-concealing agent on a glass container may be conducted either before or after the labeling. If the label is damaged by the abrasion-concealing agent or by the coating treatment or damaged as a result of the coating, not only such a label damage impairs appearance quality more severely than abrasions on the glass container do, but the function of the design or trademark printed on the label is impaired.

Abrasion-concealing agents which have so far been proposed include, for example, emulsions obtained by emulsifying liquid paraffins, natural waxes such as carnauba wax, animal or vegetable fats and oils, glycerin, or the like, these being used alone or in combination, with a surfactant such as a fatty acid ester or a fatty acid salt (JP-A-59-102973, JP-A-59-111947, and JP-A-59-145259). (The term "JP-A" as used herein means an "unexamined published Japanese patent application".) However, the abrasion-concealing agents using liquid paraffins or ordinary temperature-liquid fats or oils are extremely defective in that the coating films obtained therefrom are apt to be tacky and the water resistance of the films are so poor that immersion thereof in water results in formation of an oil film on the water surface. On the other hand, the abrasion-concealing agent using waxes having high melting point are defective in that they are poor in the effect of concealing abrasions, and in the process of washing with an aqueous alkaline solution, coating film pieces that have peeled off from the glass container float on the surface of the cleaning fluid in the form of a scum and re-adhere to the glass container. Further, the agents using surfactants have poor water resistance, so that the coating films disadvantageously peel off easily upon immersion in water.

An abrasion-concealing agent which is an aqueous emulsion or organic solvent solution of an organic polymer as a main component has also been proposed, but the agent cannot simultaneously satisfy both of the property of forming a film at ordinary temperature and the property of being peeled off with an aqueous alkaline solution.

On the other hand, a composition comprising a polyorganosiloxane having a silicon-bonded methyl, phenyl, and alkoxy group and a curing catalyst therefor (JP-A-55-56040) and a composition obtained by introducing a surfactant in the above composition (JP-A-56-23444) have been disclosed. The two compositions which use as a film-forming component a polyorganosiloxane having a methyl group and a phenyl group show an improved abrasion-concealing effect because the cured film has a heightened refractive index mainly due to the introduction of phenyl group so as to have the same refractive index as that of glass. However, there are cases where due to the introduction of phenyl group, the film is made poor in the property of being peeled off by washing with an aqueous alkaline solution. Moreover, since the above compositions are in the form of an alcohol solution, especially an ethanol solution, from the safety and health standpoint, the compositions tend to attack the resin coating layer on the label surface, resulting in a problem that the label damage impairs appearance quality. In addition, since such abrasion-concealing agents have flash points as low as around 13° C. due to the ethanol, they have a disadvantage that care must be taken in storage and coating to ensure the safety of the working atmosphere.

SUMMARY OF THE INVENTION

The present inventors have conducted intensive studies to obtain an abrasion-concealing agent which has excellent properties and is free from the drawbacks accompanying the conventional abrasion-concealing agents. As a result, they have now found use of a volatile polydimethylsiloxane as a diluting solvent, and a polyorganosiloxane soluble therein and having excellent abrasion-concealing properties. The present invention has been completed based on this finding.

Accordingly, one object of the present invention is to provide an abrasion-concealing agent for glass containers which is excellent in abrasion-concealing properties, film strength, water resistance, safety, workability, and the property of being removed by washing with an aqueous alkaline solution, and which does not cause damage to labels in the coating process.

Another object of the present invention is to provide a glass container in which abrasions have been concealed by the above abrasion-concealing agent.

A further object of the present invention is to provide a method for concealing abrasions on a glass container by using the above abrasion-concealing agent.

The abrasion-concealing agent for glass containers according to this invention comprises:

(A) 100 parts by weight of a polyorganosiloxane represented by the formula:

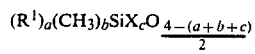

wherein $R^1$ represents a substituted or unsubstituted monovalent hydrocarbon group or hydrogen atom, X which may be the same or different each represents hydroxyl group or a hydrolyzable group, and a, b, and c each is a number satisfying the following equations, provided that a may be 0:

$$0.8 < a+b < 2$$

$$b/a > 10 \text{ (in the case of } a \neq 0\text{)}$$

$$0.3 \leq c < 2$$

and (B) 100 to 1,000 parts by weight of a volatile polydimethylsiloxane represented by the formula (I) and/or (II):

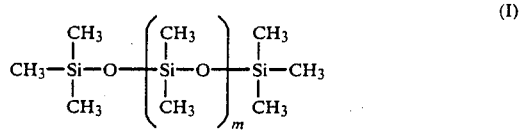

wherein m is 0 or an integer of 1 to 9,

wherein n is an integer of 3 to 8, the agent having a viscosity as measured at 25° C. of 2 to 10,000 cSt.

The abrasion-concealed glass container according to this invention comprises a glass container having formed on the surface thereof, or the surface thereof and a surface of a label attached thereto, a coating which is a cured product of the polyorganosiloxane.

The method for concealing abrasions on a glass container according to this invention comprises the step of attaching a label to a glass container, the step of coating the abrasion-concealing agent on the labeled glass container, and the step of curing the agent coated.

DETAILED DESCRIPTION OF THE INVENTION

Component (A) which can be used in this invention is a polyorganosiloxane represented by the formula

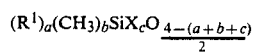

and constitutes the base polymer. $R^1$ which may be the same or different each is a substituted or unsubstituted monovalent hydrocarbon group or hydrogen atom. Examples of the substituted or unsubstituted monovalent hydrocarbon group include an alkyl group having 1 to 12 carbon atoms such as methyl, ethyl, propyl, butyl, amyl, hexyl, octyl, decyl, and dodecyl, an alkenyl group such as vinyl and allyl, an aryl group such as phenyl, tolyl, and xylyl, an aralkyl group such as β-phenylethyl and β-phenylpropyl, and further include γ-glycidoxypropyl group, 3,4-epoxycyclohexylethyl group, γ-aminopropyl group, N-(β-aminoethyl)-γ-aminopropyl group, γ-methacryloxypropyl group, γ-mercaptopropyl group, cyanoethyl group, chloromethyl group, γ-chloropropyl group, and 3,3,3-trifluoropropyl group. Of these, methyl is particularly preferred from the standpoints of easy availability of raw materials, removal of the coating film by washing with an aqueous alkaline solution, and non-toxicity. In the case where a group having the function of a curing agent, such as γ-aminopropyl group or N-(β-aminoethyl)-γ-aminopropyl group, is selected as $R^1$, there is an advantage that a curing catalyst is not necessarily required as described later.

Examples of the hydrolyzable group represented by X include an alkoxy group having 1 to 4 carbon atoms, acetoxy group, an amino group, an aminoxy group, a ketoxime group, an amido group, an alkenyloxy group, and a halogen atom. Preferred as X are hydroxyl group and an alkoxy group having 1 to 4 carbon atoms, because by-products generated in the curing reaction of the polyorganosiloxane are less odorous and the polyorganosiloxane shows good curing properties and gives a cured film having good properties. Particularly preferred of these groups are hydroxyl group, methoxy group, and ethoxy group.

Symbols a, b, and c each should be a number satisfying the following equations.

$$0.8 < a+b < 2$$

$$b/a > 10 \text{ (in the case of } a \neq 0)$$

$$0.3 \leq c < 2$$

If (a+b) is 0.8 or less, the polyorganosiloxane gives cured films that are too brittle, while if it is 2 or more, cured films with good properties cannot be obtained and the films disadvantageously possess slip characteristics as if an oily ingredient has oozed out from the films. Thus, the values of (a+b) exceeding the above range are not suitable for the objects of this invention. If b/a is 10 or less and $R^1$ is a group or groups other than methyl, there are problems that the content of such group(s) is so high that the polyorganosiloxane is difficult to dissolve in the volatile polydimethylsiloxane, component (B), and that the resulting films cannot be completely removed by washing with an aqueous alkaline solution. In the case where b/a is larger than 10, i.e., most of the silicon-bonded groups are methyl, and in the case of a=0, i.e., all the silicon-bonded groups are methyl, the polyorganosiloxane gives cured films having good properties.

If c, which indicates the amount of the functional group(s) of X taking part in a curing reaction, is less than 0.3, the curing rate is too low for practical use. If c is 2 or more, the resulting cured films are too brittle. Thus, such c values are not suitable for the objects of this invention.

The polyorganosiloxane (A) used in this invention can be in a liquid state or solid state, but it should be soluble in component (B) used in this invention. Such a polyorganosiloxane may have a monodispersion molecular weight distribution, a polydispersion molecular weight distribution, or a mixture thereof. Normally, the polyorganosiloxane is prepared beforehand so as to have an average viscosity measured at 25° C. of from 10 to 100,000 cSt, before being mixed with and dissolved in component (B). If the average viscosity thereof is less than 10 cSt, the resulting abrasion-concealing agent cannot generally be applied on glass container surfaces in a sufficient amount, resulting in poor abrasion-concealing properties. On the other hand, if the average viscosity thereof exceeds 100,000 cSt, coating films in the course of cure are apt to be tacky, and the abrasion-concealing agent is insufficient in penetration into abrasions or in coatability due to the high viscosity, occasionally resulting in poor abrasion-concealing properties.

Such polyorganosiloxane (A) can be easily obtained by a method known to artisans. That is, one organo silicon compound or a mixture of two or more organo silicon compounds suitably selected from alkoxysilanes such as a methyltrialkoxysilane, a dimethyldialkoxysilane, a trimethylalkoxysilane, a tetraalkoxysilane, a phenyltrialkoxysilane, a diphenyldialkoxysilane, a triphenylalkoxysilane, a methylphenyldialkoxysilane, and a methyldiphenylalkoxysilane, chlorosilanes obtained by substituting alkoxy groups of these alkoxysilanes with chlorine atom to convert the silanes to corresponding ones, and organosilicon compounds obtained by substituting alkyl groups of alkylalkoxysilanes with vinyl group, γ-glycidoxypropyl group, 3,4-epoxycyclohexylethyl group, γ-aminopropyl group, N-(β-aminoethyl)-γ-aminopropyl group, γ-methacryloxypropyl group, γ-mercaptopropyl group, cyanoethyl group, chloromethyl group, γ-chloropropyl group, 3,3,3-trifluoropropyl group, or the like is subjected to partial or total hydrolysis and then partial condensation, thereby giving a polyorganosiloxane (A). Two or more polyorganosiloxanes obtained by such a method and having different properties may be blended with each other for use as component (A).

Component (B) used in this invention is a volatile polydimethylsiloxane represented by the formula (I) and/or (II). This volatile polydimethylsiloxane serves as a solvent in the abrasion-concealing agent containing component (A) and is the other important ingredient which is the characteristic of the present invention.

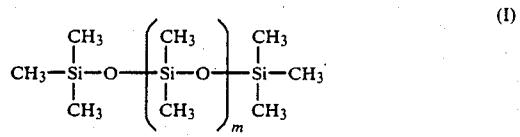

(I)

wherein m represents 0 or an integer of 1 to 9.

(II)

wherein n represents an integer of 3 to 8.

The above volatile polydimethylsiloxane is a trimethylsiloxy-terminated straight-chain polydimethylsiloxane in which m is 0 to 9 and/or a cyclic polydimethylsiloxane in which n is 3 to 8. Either of a straight-chain polydimethylsiloxane, a cyclic polydimethylsiloxane or a mixture thereof is used as component (B), taking into account the solubility of component (A). Component (B) is preferably a straight-chain polydimethylsiloxane in which m is 0 to 5 and/or a cyclic polydimethylsiloxane in which n is 3 to 7, and is most preferably a cyclic polydimethylsiloxane in which n is 4 or 5. Straight-chain polydimethylsiloxanes useful in this invention generally have a viscosity of less than 10 cSt at 25° C.

The term "volatile" used herein means that the substance has a measurable vapor pressure. Such polydimethylsiloxanes preferably have a boiling point of 99° to about 260° C.

Component (B) serves to improve the coating properties of the abrasion-concealing agent through the dilution and dissolution of component (A). Due to its low surface tension and a low rate of volatilization as compared to alcohol-type solvents, component (B), which is a low molecular weight polydimethysiloxane, enables the resulting abrasion-concealing agent to well penetrate into fine and deep abrasions and show excellent leveling characteristics, thereby forming a film having excellent abrasion-concealing properties. Due to the use of such component (B), the abrasion-concealing agent of this invention has been far more improved in the property of concealing fine and deep abrasions on glass containers than conventional abrasion-concealing agents of the non-solvent type or the alcohol-solvent type which is relatively quick-drying.

A further important feature of component (B) is that it never causes damage to labels. Since component (B), unlike alcohol-type solvents, does not affect the resin coating layers or prints on label surfaces, the abrasion-concealing agent can be applied by a so-called "post-coating" in which the concealing agent is coated on glass containers after labels have been attached to the containers. The concealing agent may be applied on a glass container either before or after the labeling step. However, from the standpoints of diminishing adverse effects on the adhesion of labels and attaining uniform peeling of labeled parts of the coating films in the washing process with an aqueous alkaline solution, it is preferred to conduct coating of the concealing agent after labels are attached. Hence, the present invention has made post-coating of an abrasion-concealing agent possible by the use of component (B).

Furthermore, component (B) has another advantage that since it has a higher flash point and is less odorous and poisonous than alcohol-type solvents, coating operations can be carried out in safety.

The amount of component (B) added to the abrasion-concealing agent is from 100 to 1,000 parts by weight per 100 parts by weight of component (A). The amount of component (B) is preferably from 150 to 800 parts by weight, and is most preferably from 200 to 600 parts by weight per 100 parts by weight of component (A). If the amount thereof is less than 100 parts by weight, the amount of component (A) coated on a glass container becomes too large, so that the leveling properties of the coating surface and the coating's property of curing and drying in a certain period of time are impaired, resulting in a fear of "orange peel" or surface tack. If the amount of component (B) exceeds 1,000 parts by weight, the amount of component (A) applied on a glass container becomes insufficient, so that a satisfactory abrasion-concealing effect is difficult to obtain.

Certain kinds of hydrocarbons having 6 to 16 carbon atoms, short-chain alcohols, or the like may be mixed with the abrasion-concealing agent before use so long as such hydrocarbon or alcohol used does not adversely affect the present invention.

The abrasion-concealing agent of this invention is obtained by dissolving the above-described component (A) in component (B). The concealing agent thus obtained has a viscosity as measured at 25° C. in the range of from 2 to 10,000 cSt, preferably from 5 to 1,000 cSt, and more preferably from 10 to 200 cSt. If the viscosity thereof at 25° C. is less than 2 cSt, the amount of the concealing agent coated on a glass container is so small that a sufficient abrasion-concealing effect cannot be obtained if coating is performed only once. On the other hand, if the viscosity thereof exceeds 10,000 cSt, the coated amount thereof becomes too large with an increased thickness of the coating film, resulting in a drawback that such thick coating film is rather apt to suffer abrasions than less apt to do.

The abrasion-concealing agent of this invention is in general required to be used in combination with a curing catalyst, provided that in the case where the groups of $R^1$ in the polyorganosiloxane, component (A), include a group having the function of a curing catalyst, such as $\gamma$-aminopropyl group or N-($\beta$-aminoethyl)-$\gamma$-aminopropyl group, there is no particular need of using a curing catalyst.

Examples of the curing catalyst include organic amines such as triethanolamine; metal salts of carboxylic acids such as iron octylate and zinc octylate; organotin compounds such as tin dioctylate, dibutyltin dilaurate, dioctyltin dilaurate, and dibutyltin dioctoate; titanic acid esters such as tetrapropyl titanate and tetrabutyl titanate; and quaternary ammonium salts such as a quaternary ammonium salt of an organosilicon. Of these, dibutyltin dilaurate, dioctyltin dilaurate, or tetrabutyl titanate is preferred from the standpoints of curability, and also safety and health.

The amount of the curing catalyst added is 0.01 to 7 parts by weight, preferably 0.02 to 5 parts by weight, per 100 parts by weight of component (A). If the amount thereof added is less than 0.01 part by weight, the cure and drying of the coating is too slow for practical use. On the other hand, if the curing catalyst is used in an amount exceeding 7 parts by weight, there is a drawback that such a large amount of the catalyst impairs the storage stability of the abrasion-concealing agent rather than has a further effect on film formation.

The abrasion-concealing agent of this invention, which comprises the above-described components (A) and (B) and, according to need, a curing catalyst, may contain various auxiliary ingredients other than the above three components. Examples of such auxiliary ingredients include plasticizing ingredients for regulating film hardness and controlling the property of being removed by washing with an aqueous alkaline solution, such as higher fatty acid esters, surfactants, and animal or vegetable fats and oils; additives for preventing the components from deteriorating or becoming odorous due to visible light or ultraviolet rays, such as pigments and ultraviolet absorbers; and other additives including coloring agents such as dyes, leveling agents, thickening agents, and inorganic powders.

For coating the abrasion-concealing agent on a glass container, a conventional method can be used, such as brushing, spray coating, puff coating, dip coating, flow coating, transfer coating, or the like. In order to coat a large quantity of glass containers, which are narrow-necked glass bottles in most cases, a rotary-type coating apparatus as disclosed in, for example, JP-A-58-213654 or a coating belt-type coating apparatus as disclosed in, for example, JP-B-1-59221 is employed. (The term "JP-B" as used herein means an "examined Japanese patent publication".)

The thickness of the coating film is generally from 0.5 to 10 $\mu$m, preferably from 1 to 3 $\mu$m, from the standpoints of the effect of concealing abrasions, appropriate film strength, and easy peelability in the washing process using an aqueous alkaline solution. Although the part of a glass container to be coated with the abrasion-concealing agent is of course not limited to the part having abrasions, it is advantageous to coat the abrasion-bearing part only so as to give a film of the above thickness, in order to treat glass containers (glass bottles) continuously fed in a large quantity, ensure their conveyer-line transfer, and attain cost reduction.

After the abrasion-concealing agent is coated, a cured film free of surface tack is easily obtained as an abrasion-concealing coating film in about 0.5 to 5 hours by allowing the coated glass container to stand at ordinary temperature. However, for reducing the curing time or for other purposes according to need, the coated glass container may be heated for a moment at such a low temperature which does not impair the quality of the contents, i.e., at around 70° C. or a lower temperature.

With the abrasion-concealing agent of this invention, post coating is possible in which the abrasion-concealing agent is applied after a label has been attached to the glass container.

The method for concealing abrasions on a glass container according to the present invention comprises the steps of attaching a label to a glass container having abrasions, coating the abrasion-concealing agent of this invention on the labeled glass container, and curing the abrasion-concealing agent coated.

The abrasion-concealing agent of this invention does never cause damage to the resin coating layer or print on the label even where it is coated on the label. The advantages of post coating have been described hereinbefore.

The abrasion-concealing agent of the present invention gives cured films excellent in abrasion-concealing properties, film strength, and water resistance and, hence, improves the appearance quality of returnable glass containers collected from market and reused many times. Further, the abrasion-concealing agent of this invention is safe, and cured films obtained therefrom are excellent in the property of being removed by washing with an aqueous alkaline solution, thereby attaining good workability. Furthermore, the abrasion-concealing agent never impairs the appearance quality of the glass container and the functions of the design and trademark on the label, because coating of the abrasion-concealing agent does not cause label damage.

The abrasion-concealed glass container of the present invention, which will be collected from market after use for repeated use, has improved appearance quality. Therefore, the lifetimes of glass containers can be prolonged, and the prolonged lifetimes of glass containers contribute to resource saving and serve to diminish the environmental pollution problem caused by non-returnable synthetic plastic containers, etc.

According to the method of this invention for concealing abrasions on a glass container, the adhesion of the label to the glass container is affected little due to the post coating in which the abrasion-concealing agent is applied after the glass container is labeled.

The present invention will be explained below in more detail by reference to the following Examples and Comparative Examples which should not be construed to be limiting the scope of the invention, in which all amounts are expressed in terms of parts by weight.

SYNTHESIS EXAMPLES 1 TO 3

Each of polyorganosiloxanes R-1, R-2, and R-3 was prepared as follows.

Into a flask equipped with a heating jacket, water distilling receiver, and dropping funnel were introduced the alkoxysilane(s) shown in Table 1 and acetic acid in amounts shown in Table 1. The resulting mixture was gradually heated with stirring and, at the time when the temperature of the liquid in the flask reached 80° C., water was gradually added dropwise in a total amount as shown in Table 1. The resulting mixture was kept for 4 hours at a temperature that was the reflux temperature of the alcohol eliminated by the reaction (about 78°-83° C.), thereby conducting partial hydrolysis and condensation reaction. Subsequently, the alcohol evaporated and condensed was removed with the water distilling receiver under ordinary pressure. At the time when evaporation and condensation of alcohol ceased and the temperature of the liquid reaction mixture began to rise, the heating was stopped and the resulting reaction mixture was then cooled to ordinary temperature. Thus, polyorganosiloxanes R-1, R-2, and R-3 were obtained.

The viscosities, organic group contents, and other properties of R-1, R-2, and R-3 are shown in Table 1, in which all of the values of organic group content, methyl group content, and X content were obtained by calculation based on the amounts charged.

TABLE 1

|  | R-1 | R-2 | R-3 |
| --- | --- | --- | --- |
| Amount Charged: | | | |
| Methyltriethoxysilane | 100 (0.56) | 80 (0.45) | 80 (0.45) |
| Dimethyldimethoxysilane | | 20 (0.17) | |
| Phenyltriethoxysilane | | | 20 (0.08) |
| N-(β-aminoethyl)-γ-aminopropylmethyldimethoxysilane | | | 1 (0.005) |
| Acetic acid | 5 | 5 | |
| Water | 12 (0.67) | 13 (0.72) | 11 (0.61) |
| Property: | | | |
| Viscosity (25° C.) cSt | 200 | 150 | 120 |
| Organic group content (a + b) | 1.00 | 1.27 | 1.00 |
| Methyl group content (b/a) | Me group only | Me group only | 5.3 |
| X content (c) | 0.62 | 0.38 | 0.72 |

The amounts charged in parentheses are given in terms of mole, and Me group means methyl group.

SYNTHESIS EXAMPLE 4

Into a flask equipped with a stirrer, heating jacket, condenser, and dropping funnel were introduced 1,780 g (10 moles) of methyltriethoxysilane, 200 g of acetone, and hydrochloric acid in an amount such that a hydrogen chloride content became 50 ppm. To the resulting mixture, 234 g (13 moles) of water was gradually added dropwise from the dropping funnel while stirring the mixture. The mixture was then kept at the reflux temperature (about 68°-72° C.) for 3 hours, thereby conducting partial hydrolysis and condensation reaction. The reaction mixture was cooled slowly and the volatile components were then evaporation-removed at reduced pressure under conditions of 30 mmHg and 50° C., thereby obtaining 660 g of a polyorganosiloxane (R-4).

The viscosity, organic group content, methyl group content, and X content (all values of these being calculated values; and hereinafter the same) of R-4 are shown in Table 2.

SYNTHESIS EXAMPLE 5

Into a flask equipped with a stirrer, heating jacket, condenser, and dropping funnel were introduced 952 g (7 moles) of methyltrimethoxysilane, 198 g (1 mole) of phenyltrimethoxysilane, 516 g (4 moles) of dimethyldichlorosilane, and 1,500 ml of toluene. To the resulting mixture, 234 g (13 moles) of water was gradually added dropwise from the dropping funnel while stirring the mixture. After completion of the addition, the temperature of the liquid reaction mixture was kept at about 110° C. for 1 hour to conduct heat reflux. The resulting liquid reaction mixture was cooled slowly to room temperature, transferred to a separatory funnel, and allowed to stand to separate into an organic layer and an aqueous layer. The aqueous layer as the lower layer was then removed to obtain a toluene solution of a polyorganosiloxane. To this organic layer was added a saturated common salt aqueous solution. The resulting mixture was agitated sufficiently and then allowed to stand, and the resulting aqueous layer was separated. This salting-out operation was repeated twice, and the organic layer was then washed twice with water by employing the same procedure as above except that water was added. The resulting organic layer was placed in a flask equipped with a stirrer, heating jacket, and water distilling receiver, and the volatile components were evaporation-removed by heating the contents at 80° C. for 3 hours under a pressure of 30 mmHg. Thus, 860 g of a polyorganosiloxane (R-5) was obtained.

The viscosity, organic group content, and other properties of R-5 are shown in Table 2.

SYNTHESIS EXAMPLE 6

Into a flask equipped with a stirrer, heating jacket, condenser, and dropping funnel were introduced 1,362 g (10 moles) of methyltrimethoxysilane and hydrochloric acid in an amount such that a hydrogen chloride content became 50 ppm. While the resulting mixture was kept being stirred, 200 g (11 moles) of water was gradually added thereto dropwise from the dropping funnel. The resulting mixture was kept for 3 hours at a temperature that was the reflux temperature of the alcohol eliminated by the reaction (about 78° C.), thereby conducting partial hydrolysis and condensation reaction. The reaction mixture was cooled slowly and the volatile components were evaporation-removed at reduced pressure under conditions of 30 mmHg and 50° C., thereby obtaining 600 g of a polyorganosiloxane (R-6).

The viscosity, organic group content, and other properties of R-6 are shown in Table 2.

SYNTHESIS EXAMPLE 7

Into a flask equipped with a stirrer, heating jacket, condenser, and dropping funnel were introduced 1,780 g (10 moles) of methyltriethoxysilane, 216 g (2 moles) of trimethylchlorosilane, and 2,000 ml of toluene. While the resulting mixture was kept being stirred, 1,050 g (60 moles) of water was gradually added thereto dropwise from the dropping funnel. After completion of the addition, the temperature of the liquid reaction mixture was kept at about 110° C. for 1 hour to conduct heat reflux. The resulting liquid reaction mixture was cooled slowly to room temperature, transferred to a separatory funnel, and allowed to stand to separate into an organic layer and an aqueous layer. The aqueous layer as the lower layer was then removed to obtain a toluene solution of a polyorganosiloxane. To this organic layer was added a saturated common salt aqueous solution. The resulting mixture was agitated sufficiently and then allowed to stand, and the resulting aqueous layer was separated. This salting-out operation was repeated twice, and the organic layer was washed twice with water by employing the same procedure as above except that water was added. The resulting organic layer was placed in a flask equipped with a stirrer, heating jacket, and water distilling receiver, and the volatile components were evaporation-removed by heating the contents at 80° C. for 3 hours under a pressure of 30 mmHg, thereby obtaining a polyorganosiloxane. To this polyorganosiloxane was added potassium hydroxide in an amount such that its content became 50 ppm. The resulting polyorganosiloxane was heated at 180° C. for 5 hours for further condensation and then neutralized with ethylene chlorohydrin, thereby obtaining 760 g of a resin (R-7).

The organic group content and other properties of R-7 are shown in Table 2.

TABLE 2

| | R-4 | R-5 | R-6 | R-7 |
|---|---|---|---|---|
| Property: | | | | |
| Viscosity (25° C.) cSt | 120 | 5,000 | 6 | Solid |
| Organic group content (a + b) | 1.00 | 1.33 | 1.00 | 1.40 |
| Methyl group content (b/a) | Me group only | 15 | Me group only | Me group only |
| X content (c) | 0.4 | Soluble* | 0.8 | Soluble* |

*Note:
In the item "X content (c)", "soluble" means "soluble in (B) component". In R-5 and R-7, X is hydroxyl group.

EXAMPLES 1 TO 9 AND COMPARATIVE EXAMPLES 1 TO 5

The polyorganosiloxanes (R-1, R-2, R-3, R-4, R-5, R-6, and R-7) synthesized in Synthesis Examples 1 to 7 were used as a base resin alone or in the form of a blend thereof. To each of the base resins, various ingredients were added in amounts shown in Table 3. Thus, abrasion-concealing agents A-1 to A-9 according to this invention were obtained.

For the purpose of comparison, abrasion-concealing agents B-1 to B-5 were obtained by blending the ingredients shown in Table 4 in amounts shown in Table 1.

B-1 is a concealing agent whose viscosity is too low. B-2 is one whose viscosity is too high. B-3 is one in which the content of phenyl group as the group other than methyl in the silicon-bonded organic groups is too high. B-4 and B-5 each is one using ethanol as a diluent.

Conditions for Preparation of Bottles to be Tested

A prescribed label is attached to each of large beer bottles (633 ml) each having abrasions over the side surface thereof. Each composition is coated on the labeled bottles at a coating amount of 0.5 g per bottle. The resulting bottles are allowed to stand in an atmosphere of 25° C., 50% RH for 7 days to prepare bottles to be evaluated.

Shaking Conditions

The bottles are placed in a beer bottle case made of plastic and having a capacity of 20 large bottles (633 ml). This case with the bottles is set on a reciprocating shaking machine and shaked for 30 minutes at a frequency of 120 times per minute (stroke 10 cm).

Abrasion-Concealing Effect

The appearance of the bottles is visually examined before and after the shaking to evaluate the abrasion-concealing effect.

⊚ : Abrasions have been satisfactorily concealed and the film has good transparency.

o: Abrasions are partly exposed but the film has good transparency.

Δ: Abrasions are partly exposed and the film has slightly poor transparency.

x: Abrasion-concealing effect is insufficient, with almost no improvement in appearance.

Water Resistance 1

The bottles to be evaluated are immersed in a water bath of 20° C. for 3 days and then taken out, and the appearance of the bottles is visually examined.

⊚ : Abrasion-concealing effect before the immersion does not change.

o: Abrasion-concealing effect is lessened from to o, or from o to Δ.

x: Abrasion-concealing effect is lessened from or o to x.

Water Resistance 2

After the immersion test in Water Resistance 1, the surface of the bath water is examined for an oil film.

⊚ : No oil film is observed on the bath water surface.

o: A slight oil film is observed.

x: A considerable oil film is observed.

Abrasion-Concealing Effect on Wet Bottle

The same abrasion-bearing bottles as described under "Conditions for Preparation of Bottles to be Tested" are filled with water of 5° C. and then allowed to stand for 5 minutes in an atmosphere of 30° C., 70% RH, thereby allowing water vapor to condense to water and adhere to the bottle surfaces. The resulting wet bottles are subjected to the same coating treatment as that for the dry bottles and the abrasion-concealing effect is likewise evaluated.

Label Damage

Commercially available aluminum-foil labels attached to the bottles are evaluated for appearance before and after shaking.

⊚ : The label retains the same appearance as that of labels which have undergone no coating treatment and no shaking.

o: The label suffers no abrasions but part of the label is fouled.

x: The print suffers abrasions and the label is fouled over the whole surface.

Alkali Washing Suitability

The coated bottles are washed with a 5% aqueous solution of caustic soda at 60° C. for 10 minutes, and the degree of film removal is evaluated.

⊚ : The coating film on the bottle is completely removed.

o: Limited part of the film remains intact, but complete removal is attained by further 5-minute washing.

Δ: Part of the film remains intact, and complete removal is attained by further 10-minute washing.

x: The greater part of the film remains intact, and further 10-minute washing cannot remove it completely.

TABLE 3

|  | Examples | | | | | | | | |
|---|---|---|---|---|---|---|---|---|---|
|  | A-1 | A-2 | A-3 | A-4 | A-5 | A-6 | A-7 | A-8 | A-9 |
| Formation: | | | | | | | | | |
| R-1 | 20 | | | | | | | | |
| R-2 | | 20 | | | | 1 | | 15 | |
| R-3 | | | 5 | | | | | | |
| R-4 | | | | 15 | | 50 | 15 | | |
| R-5 | | | | | 10 | | 18 | 15 | 12.5 |
| R-6 | | | | | | | 1 | | |
| R-7 | | | | | | | | 5 | 37.5 |
| Octamethylcyclotetrasiloxane | 40 | 30 | 40 | 50 | 40 | 50 | 30 | 70 | 25 |
| Decamethylcyclopentasiloxane | 40 | 20 | 40 | 40 | 10 | 30 | 30 | | 25 |
| Decamethyltetrasiloxane | | 30 | | | | | 20 | | |
| Ethyl alcohol | | | | | | | | | |
| Dioctyltin dilaurate | 0.04 | | 0.05 | 0.02 | | | | | |
| Tetrabutyl titanate | | 0.10 | | | | 0.20 | | 0.10 | |
| Amine* | | | | | 0.30 | 0.50 | | 0.20 | |
| Viscosity of concealing agent (25° C.) cSt | 18.0 | 15.0 | 6.0 | 30.0 | 50.0 | 100 | 1,100 | 50.0 | 8,100 |
| Property before shaking: | | | | | | | | | |
| Concealing effect | ⊚ | ⊚ | ⊚ | ⊚ | ⊚ | o | o | o | o |
| Water resistance 1 | ⊚ | ⊚ | ⊚ | ⊚ | ⊚ | ⊚ | ⊚ | ⊚ | ⊚ |
| Water resistance 2 | ⊚ | ⊚ | ⊚ | ⊚ | ⊚ | ⊚ | ⊚ | ⊚ | ⊚ |
| Label damage | ⊚ | ⊚ | ⊚ | ⊚ | ⊚ | ⊚ | ⊚ | ⊚ | ⊚ |
| Concealing effect on wet bottle | ⊚ | ⊚ | ⊚ | o | o | o | ⊚ | o | o |
| Property after shaking: | | | | | | | | | |
| Concealing effect | ⊚ | o | o | o | o | o | o | o | o |
| Label damage | ⊚ | ⊚ | ⊚ | ⊚ | ⊚ | ⊚ | ⊚ | ⊚ | ⊚ |
| Alkali washing suitability | ⊚ | o | ⊚ | ⊚ | ⊚ | ⊚ | o | o | o |

*Amine: γ-aminopropylmethyldimethoxysilane

TABLE 4

|  | Comparative Examples | | | | |
|---|---|---|---|---|---|
|  | B-1 | B-2 | B-3 | B-4 | B-5 |
| Formation: | | | | | |
| R-1 | | | | 20 | |
| R-2 | | | | | |
| R-3 | | | 20 | | |
| R-4 | | | | | |
| R-5 | | | | | 20 |
| R-6 | 20 | | | | |
| R-7 | | 50 | | | |
| Octamethylcyclotetrasiloxane | 10 | 25 | 40 | 30 | 30 |
| Decamethylcyclopentasiloxane | | 25 | 40 | 20 | |
| Decamethyltetrasiloxane | 70 | | | | |

TABLE 4-continued

|  | Comparative Examples | | | | |
|---|---|---|---|---|---|
|  | B-1 | B-2 | B-3 | B-4 | B-5 |
| Ethyl alcohol |  |  |  | 30 | 50 |
| Dioctyltin dilaurate | 0.04 | 0.04 |  | 0.05 | 0.05 |
| Tetrabutyl titanate |  |  | 0.10 |  |  |
| Amine* |  |  |  |  |  |
| Viscosity of concealing agent (25° C.) cSt | 1.6 | 12,000 | 17.0 | 20.0 | 100 |
| Property before shaking: |  |  |  |  |  |
| Concealing effect | X | X | ◎ | ◎ | Δ |
| Water resistance 1 | Δ | O | O | O | O |
| Water resistance 2 | Δ | O | O | ◎ | O |
| Label damage | Δ | O | O | X | X |
| Concealing effect on wet bottle | X | Δ | ◎ | ◎ | Δ |
| Property after shaking: |  |  |  |  |  |
| Concealing effect | X | X | Δ | ◎ | Δ |
| Label damage | O | O | O | X | X |
| Alkali washing suitability | O | X | X | X | O |

*Amine: γ-aminopropylmethyldimethoxysilane

As shown in Tables 3 and 4, all of abrasion-concealing agents A-1 to A-9 according to the present invention give good results with respect to each of abrasion-concealing properties, water resistance, the property of not damaging labels, film durability, suitability to washing with an aqueous alkaline solution, and other properties.

By contrast, all the abrasion-concealing agents of Comparative Examples are defective as follows. B-1 has poor abrasion-concealing properties because its viscosity is too low. B-2 is slightly poor in the property of concealing fine or deep abrasions because its viscosity is too high, and is also defective in that since the coating film has a large thickness and poor smoothness, the film durability is poor and hence its abrasion-concealing properties after shaking are poor. Because of its large thickness, the film of B-2 is also poor in the property of being peeled off by washing with an aqueous alkaline solution. The film of B-3 is poor in the property of being removed by washing with an aqueous alkaline solution, because the base resin for B-3 contains phenyl group in a relatively large amount. B-4 causes damage to labels because it employs ethanol as a diluent. B-5 which uses ethanol as a diluent also causes damage to labels. Further, although B-5 uses a high-viscosity base resin, it shows a slightly poor abrasion-concealing effect. The reason for this may be that the combination of such a base resin and ethanol having a high rate of volatilization results in poor coating properties of B-5, so that sufficient penetration of the base resin into abrasions could not be attained.

From the above results, the abrasion-concealing agent and the method for concealing abrasions according to the present invention have been ascertained to give good results with respect to the effect of concealing abrasions, the effect of not causing label damage, and other properties.

While the invention has been described in detail and with reference to specific embodiments thereof, it will be apparent to one skilled in the art that various changed and modifications can be made therein without departing from the sprit and scope thereof.

What is claimed is:

1. An abrasion-concealing agent for glass containers, which comprises:
   (A) 100 parts by weight of a polyorganosiloxane represented by the formula:

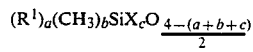

wherein $R^1$ represents a substituted or unsubstituted monovalent hydrocarbon group or hydrogen atom, X which may be the same or different each represents hydroxyl group or a hydrolyzable group, and a, b, and c each is a number satisfying the following equations, provided that a may be 0:

$$0.8 < a+b < 2$$

$$b/a > 10 \text{ (in the case of } a \neq 0)$$

$$0.3 \leq c \leq 2$$

and
   (B) 100 to 1,000 parts by weight of a volatile polydimethylsiloxane represented by the formula (I) the formula (II) or mixtures of the formula (I) and the formula (II):

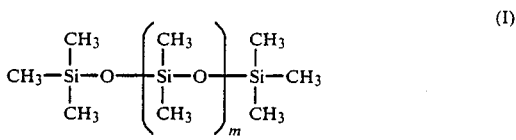

wherein m is 0 or an integer of 1 to 9,

wherein n is an integer of 3 to 8, the agent having a viscosity as measured at 25° C. of 2 to 10,000 cSt.

2. An abrasion-concealing agent for glass containers as claimed in claim 1, wherein $R^1$ is at least one member selected from the group consisting of an alkyl group having 1 to 12 carbon atoms, vinyl group, phenyl group, β-phenylethyl group, β-phenylpropyl group, γ-glycidoxypropyl group, 3,4-epoxycyclohexylethyl group, γ-aminopropyl group, N-(β-aminoethyl)-γ-aminopropyl group, γ-methacryloxypropyl group, γ-mercaptopropyl group, cyanoethyl group, chloromethyl group, γ-chloropropyl group, 3,3,3-trifluoropropyl group, and hydrogen atom.

3. An abrasion-concealing agent for glass containers as claimed in claim 1, wherein $R^1$ is at least one member selected from the group consisting of γ-aminopropyl group and N-(β-aminoethyl)-γ-aminopropyl group.

4. An abrasion-concealing agent for glass containers as claimed in claim 1, wherein $R^1$ is methyl group.

5. An abrasion-concealing agent for glass containers as claimed in claim 1, wherein X is at least one member selected from the group consisting of hydroxyl group, an alkoxy group having 1 to 4 carbon atoms, acetoxy group, an amino group, an aminoxy group, a ketoxime group, an amido group, an alkenyloxy group, and a halogen atom.

6. An abrasion-concealing agent for glass containers as claimed in claim 1, wherein X is at least one member selected from the group consisting of hydroxyl group and an alkoxy group having 1 to 4 carbon atoms.

7. An abrasion-concealing agent for glass containers as claimed in claim 1, wherein m in formula (I) is 0 or an integer of 1 to 5 and n in the formula (II) is an integer of 3 to 7.

8. An abrasion-concealing agent for glass containers as claimed in claim 1, which further contains 0.01 to 7 parts by weight of a curing catalyst per 100 parts by weight of component (A).

9. An abrasion-concealing agent for glass containers as claimed in claim 8, wherein said curing catalyst is at least one member selected from the group consisting of organic amines, metal salts of carboxylic acids, organotin compounds, titanic acid esters, and quaternary ammonium salts.

10. An abrasion-concealed glass container comprising a glass container having coated on the surface thereof a coating which is a cured product of a polyorganosiloxane represented by the formula:

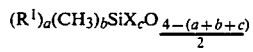

wherein $R^1$ represents a substituted or unsubstituted monovalent hydrocarbon group or hydrogen atom, X which may be the same or different each represents hydroxyl group or a hydrolyzable group, and a, b and c each is a number satisfying the following equations, provided that a may be 0:

$0.8 < a+b < 2$ $b/a > 10$ (in the case of $a \neq 0$)

$0.3 \leq c < 2$.

11. An abrasion-concealed glass container as claimed in claim 10, wherein the glass container is a bottle.

12. An abrasion-concealed glass container comprising a glass container having coated on the surface thereof and also on a label attached to the glass container having coated on the surface thereof a coating which is a cured product of a polyorganosiloxane represented by the formula:

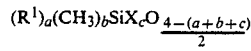

wherein $R^1$ represents a substituted or unsubstituted monovalent hydrocarbon group or hydrogen atom, X which may be the same or different each represents hydroxyl group or a hydrolyzable group, and a, b and c each is a number satisfying the following equations, provided that a may be 0:

$0.8 < a+b < 2$ $b/a > 10$ (in the case of $a \neq 0$)

$0.3 \leq c < 2$.

13. An abrasion-concealed glass container as claimed in claim 12, wherein the glass container is a bottle.

14. A method for concealing abrasions on a glass container, which comprises the steps of:
(1) attaching a label to a glass container having abrasions;
(2) coating an abrasion-concealing agent comprising:
(A) 100 parts by weight of a polyorganosiloxane represented by the formula:

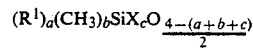

wherein $R^1$ represents a substituted or unsubstituted monovalent hydrocarbon group or hydrogen atom, X which may be the same or different each represents hydroxyl group or a hydrolyzable group, and a, b, and c each is a number satisfying the following equations, provided that a may be 0:

$0.8 < a+b < 2$ $b/a > 10$ (in the case of $a \neq 0$)

$0.3 \leq c < 2$ and
(B) 100 to 1,000 parts by weight of a volatile polydimethylsiloxane represented by the formula (I) the formula (II) or mixtures of the formula (I) and the formula (II):

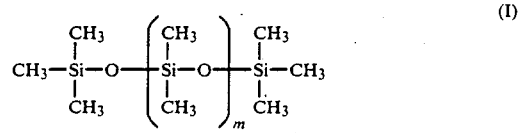

wherein m is 0 or an integer of 1 to 9,

wherein n is an integer of 3 to 8, the agent having a viscosity as measured at 25° C. of 2 to 10,000 cSt; on the labeled glass container; and
(3) curing the abrasion-concealing agent coated.

15. A method for concealing abrasions on a glass container as claimed in claim 14, wherein the step of curing the abrasion-concealing agent is carried out at ordinary temperature.

* * * * *